United States Patent [19]
Hull

[11] 3,805,910
[45] Apr. 23, 1974

[54] POWER STEERING MECHANISMS

[75] Inventor: Charles Hartley Hull, Huddersfield, England

[73] Assignee: David Brown Tractors Limited, Huddersfield, Great Britain

[22] Filed: May 22, 1972

[21] Appl. No.: 255,419

[30] Foreign Application Priority Data
June 10, 1971 Great Britain.................... 19819/71

[52] U.S. Cl............................. 180/79.2 R, 280/87 B
[51] Int. Cl.............................................. B62d 5/10
[58] Field of Search ............... 180/79.2 R; 280/87 B

[56] References Cited
UNITED STATES PATENTS
2,994,396  8/1961  Bidwell .......................... 180/79.2 R
2,855,065  10/1958  Lucien ........................... 180/79.2 R
3,014,734  12/1961  Swenson ................... 180/79.2 R X Primary Examiner—David Schonberg
Assistant Examiner—John A. Pekar
Attorney, Agent, or Firm—Norris & Bateman

[57] ABSTRACT

A power steering mechanism for a wheeled vehicle comprises a transverse piston rod fixed to a frame secured to the front axle beam, a double-acting hydraulic cylinder slidable on a piston fixed on said rod, and a lever pivotally connected between its ends to the cylinder, connected by ball joints at one of its ends to respective track rods, and pivotally connected at its other end to a fulcrum at the free end of a substantially transverse link pivotally mounted at its other end on said frame. Oil is supplied selectively to the respective ends of the cylinder via flexible hoses and drillings in the piston rod.

10 Claims, 2 Drawing Figures

POWER STEERING MECHANISMS

BACKGROUND OF INVENTION

The invention relates to a power steering mechanism for a wheeled vehicle, and more particularly to a power steering mechanism including a single, double-acting hydraulic cylinder.

A power steering mechanism including a single, double-acting hydraulic cylinder and a third class lever is already known, wherein the cylinder moves in an arc about one end of its piston rod as a result of which most of the weight of the mechanism is carried by the fixed fulcrum of the lever. The piston rod has axial bores connected to hoses for the supply and exhaust of oil to and from the respective ends of the cylinder, but an appreciable amount of slack is required in that hose connected to the bore in the free end of the rod due to the substantial arcuate movement of said end.

The object of the present invention is to obviate the above disadvantages.

SUMMARY OF INVENTION

According to the invention, a power steering mechanism for a wheeled vehicle comprises a double-acting hydraulic cylinder, a piston within the cylinder on which the cylinder is slidable, the piston having a piston rod which projects from both ends of the cylinder and is secured to the vehicle in such manner that the rod and the cylinder are disposed laterally of the vehicle, and a lever pivotally connected to a fulcrum, to the cylinder and to track rods which are connected to respective steering arms.

BRIEF DESCRIPTION OF DRAWINGS

A preferred embodiment of the invention will now be described, by way of example only, with reference to the accompanying drawings of which.

DESCRIPTION OF PREFERRED EMBODIMENT

Figure 1:
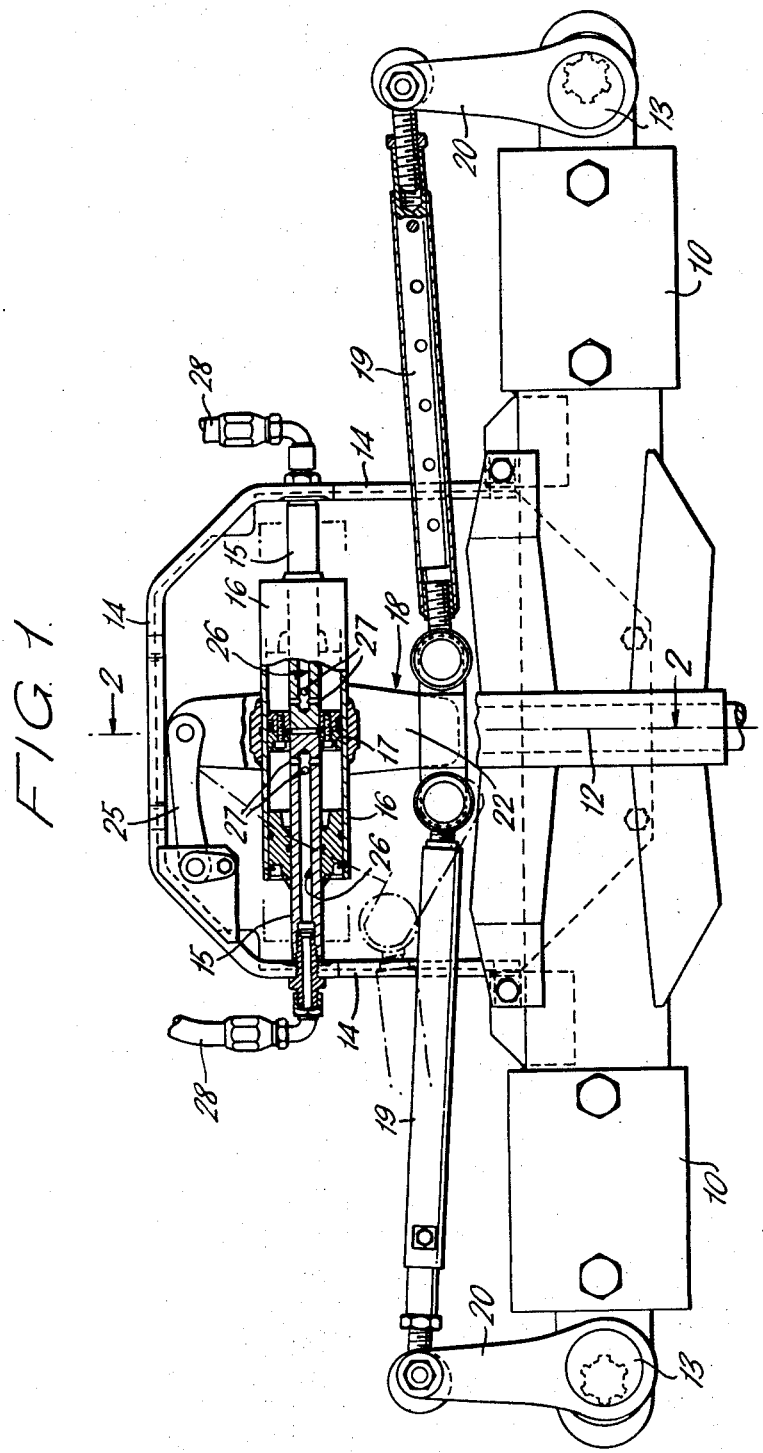
FIG. 1 is a plan view, partly in section, of the front axle beam assembly and power steering mechanism of an agricultural tractor.
Figure 2:
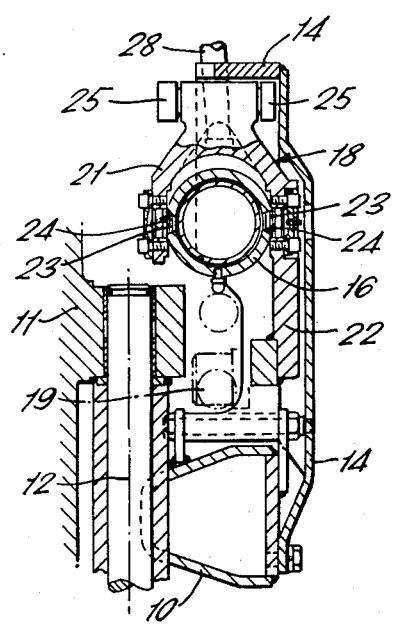
FIG. 2 is a section on the line 2—2 in FIG. 1.

Referring now to the drawings, an agricultural tractor has a conventional front axle beam assembly 10 pivotally connected to the chassis 11 of the tractor about an axis 12 extending longitudinally of the tractor. This axle beam assembly 10 has a king-pin 13 at each of its ends, and at the lower end of each kin-pin 13 there is secured a conventional stub axle (not shown) for one of the front wheels (not shown). Secured to the rear side of the axle beam assembly 10 are the ends of a rearwardly extending U-shaped frame 14 to the respective arms of which there are secured the ends of a piston rod 15 projecting from both ends of a double-acting hydraulic cylinder 16, which is slidable on a piston 17 secured to said rod. The piston rod 15 and the cylinder 16 are thus disposed laterally of the tractor. A third class lever indicated generally at 18, which is parallel to the pivot axis 12 of the axle beam assembly 10 when the steering mechanism is in its straight ahead position, is pivotally mounted between its ends on the cylinder 16 as hereinafter described and pivotally connected at its rear end to a fulcrum and at its front end to the inner ends of two track rod assemblies 19 each of which is pivotally connected at its outer end to a steering arm 20 secured to the upper end of one of the king-pins 13.

The lever 18 consists of two arms diverging forwardly from its rear end in a vertical plane, the upper arm 21 terminating above the cylinder 16 whilst the lower arm 22 projects forwardly beyond said cylinder to form the front end of the lever. The upper and lower arms 21 and 22 have inwardly projecting studs 23 on a common vertical axis, which engage pivotally in diametrically opposed holes 24 formed in the cylinder 16. The fulcrum is at the free end of a link 25 pivotally mounted on the frame 14 near the rear end thereof, said link being disposed generally laterally of the tractor so as to accommodate movement of the rear end of the lever 18 in a direction generally longitudinal of the tractor when the cylinder 16 slides on the piston 17. The piston rod 15 has axial bores 26 which extend from each of its ends almost to its mid-point and communicate via radial holes 27 adjacent their inner ends with the respective ends of the hydraulic cylinder 16 for the supply and exhaust of oil to and from the last mentioned ends, the ends of the rod 15 being connected by respective hoses 28 to a conventional steering-wheel-operated device (not shown) which controls the flow of oil between a power-driven pump (not shown), the hydraulic cylinder 16 and a sump (not shown), and acts as a manually operated pump to maintain steering control of the tractor if said power-driven pump should fail. The axle beam assembly 10 and track rod assemblies 19 are adjustable in length in well known telescopic manner to vary the track width of the tractor.

In operation, when the steering wheel is turned in one direction oil under pressure is supplied to one end of the hydraulic cylinder 16 and simultaneously permitted to return from the other end thereof to the sump. The cylinder 16 is thus caused to slide on the piston 17 as a result of which the lever 18 is caused to move about its fulcrum, said movement of the lever necessitating slight pivotting of the link 25 about its mounting point on the frame 14 as the point of pivotal connection of the lever 18 and the cylinder 16 moves in a straight line. The resulting movement of the front end of the lever 18 causes both track rod assemblies 19 to move substantially laterally of the tractor in the same direction and act via the steering arms 20, the king-pins 13 and the stub axles (not shown) to turn both front wheels of the tractor in the same direction. When the steering wheel ceases to be rotated, oil is locked hydraulically in both ends of the cylinder 16 and the front wheels are thereby temporarily held fixed in position. Rotation of the steering wheel in the other direction supplies oil under pressure to the other end of the cylinder 16 and simultaneously permits oil to return from said one end thereof to the sump, as a result of which both front wheels of the tractor are turned in the other direction.

What I Claim is:

1. A power steering mechanism for a vehicle having laterally spaced wheels, a steering arm for each wheel and track rods connected to each steering arm comprising a double-acting fluid pressure cylinder, a piston within the cylinder on which the cylinder is slidable, the piston having a piston rod which projects from both ends of the cylinder, means securing said piston rod on the vehicle in such manner that the rod and the cylinder extend on a fixed axis laterally of the vehicle, a lever pivotally mounted on a fulcrum and pivotally connected to said track rods, and means pivotally connecting said lever to the cylinder.

2. A power steering mechanism according to claim 1, wherein the lever is a third class lever pivotally mounted between its ends on the cylinder and pivotally connected at one end to the fulcrum and at the other end to the track rods.

3. A power steering mechanism according to claim 1, wherein the fulcrum is at the free end of a link pivotally mounted at its other end on the vehicle.

4. A power steering mechanism according to claim 1, wherein the piston rod is secured at both ends to an axle beam mounted on the vehicle.

5. A power steering mechanism according to claim 4, wherein the fulcrum is at the free end of a link pivotally mounted at its other end on the axle beam.

6. A power steering mechanism according to claim 5, wherein the axle beam is provided at each end with a king-pin to which one of the steering arms is secured, and said beam has secured to it a frame to which both ends of the piston rod are secured and on which said other end of the link is pivotally mounted.

7. A power steering mechanism according to claim 1, wherein the piston rod has axial bores for the supply and exhaust of fluid under pressure to and from the respective ends of the cylinder 8. A power steering mechanism as defined in claim 1, wherein said lever is pivoted intermediate its ends on said cylinder and the fulcrum is shiftably mounted to accommodate lateral sliding movement of said cylinder in operation.

9. A power steering mechanism as defined in claim 1, wherein the pivotal connection between said lever and said cylinder is on an axis substantially normal to said fixed axis along which said cylinder is slidable.

10. A power steering mechanism as defined in claim 1, wherein said lever comprises upper and lower arms extending from the fulcrum to pivotal connection with diametrically opposite side of said cylinder.

* * * * *